United States Patent Office 3,465,525
Patented Sept. 9, 1969

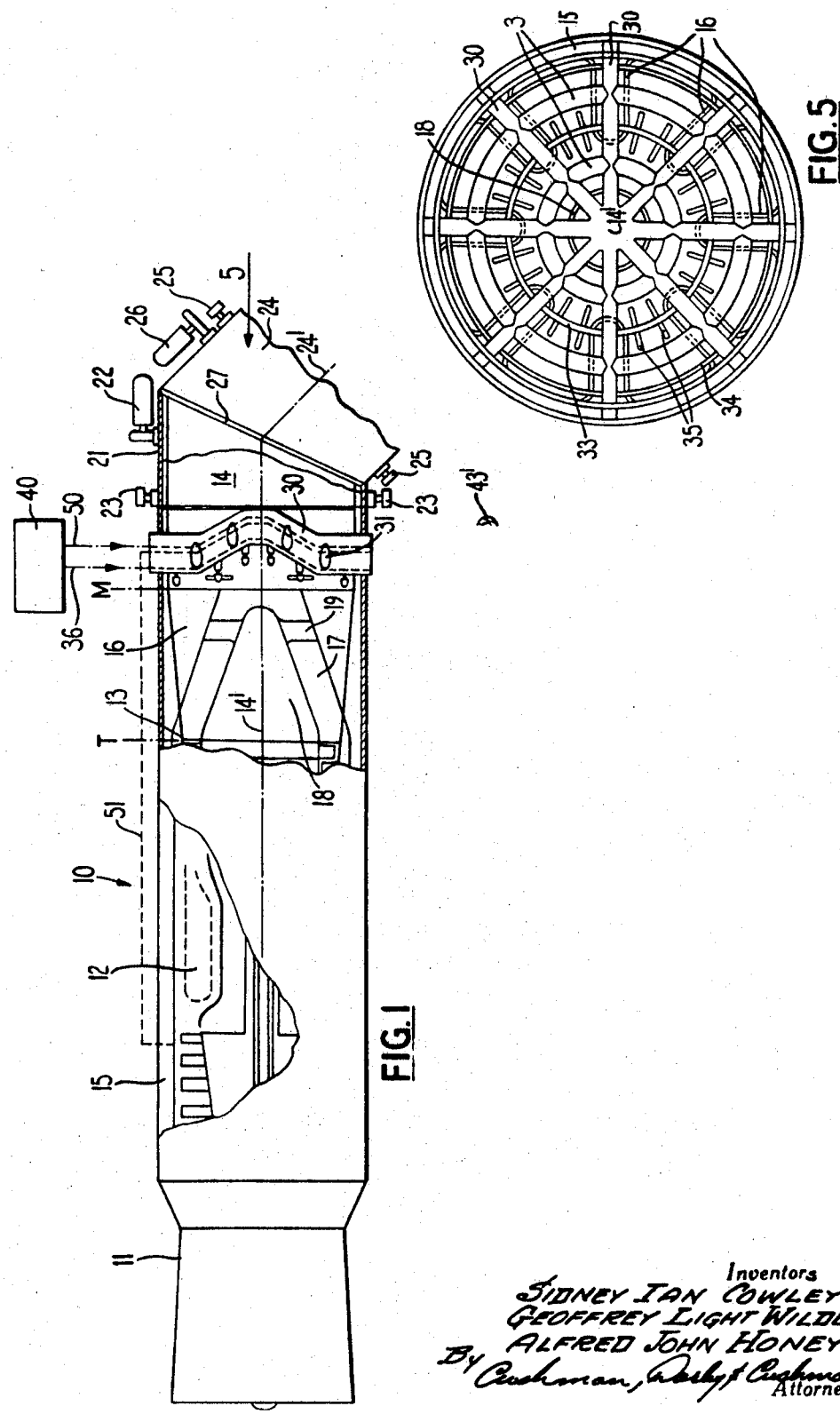

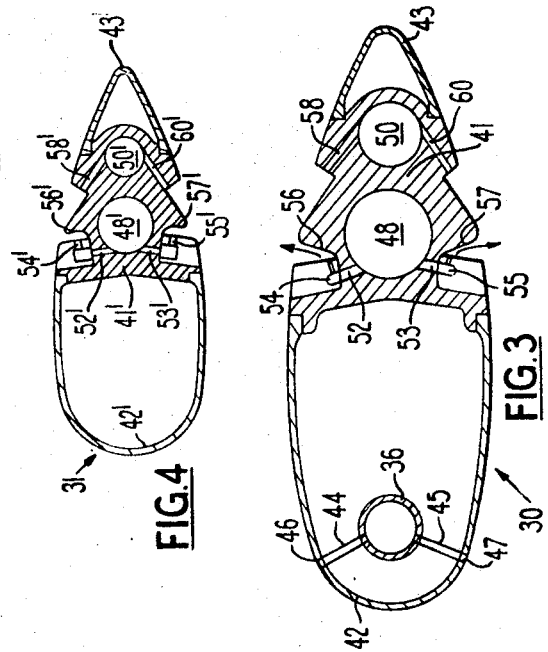
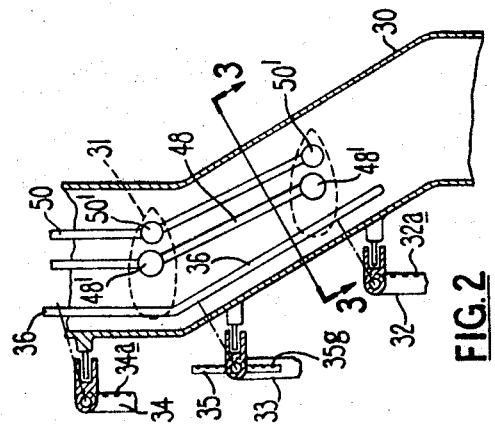

3,465,525
GAS TURBINE BYPASS ENGINES
Sidney Ian Cowley, Derby, Geoffrey Light Wilde, Turnditch, and Alfred John Honey, Derby, England, assignors to Rolls-Royce Limited, Derby, England, a British company
Filed Mar. 10, 1967, Ser. No. 622,121
Claims priority, application Great Britain, Mar. 25, 1966, 13,419/66
Int. Cl. F02k *3/10, 1/02, 3/02*
U.S. Cl. 60—261           7 Claims

ABSTRACT OF THE DISCLOSURE

A gas turbine bypass engine has mixing means in which partial mixing of bypass air with the turbine exhaust gases takes place together with diffusion of the turbine exhaust gases. Reheat combustion equipment is disposed in a jet pipe downstream of the mixing means and adapted to burn reheat fuel in a region of the jet pipe in which the mixing of the turbine exhaust gases and bypass air is substantially incomplete.

---

This invention concerns improvements in or relating to gas turbine bypass engines, that is, gas turbine engines in which a portion of the air compressed by the compressor means of the engine is supplied to a bypass duct which bypasses the combustion equipment and turbine means of the engine.

According to the present invention a gas turbine bypass engine is provided having mixing means in which partial mixing of bypass air with the turbine exhaust gases takes place together with diffusion of the turbine exhaust gases, and reheat combustion equipment disposed in a jet pipe downstream of the mixing means and adapted to burn reheat fuel in a region of said jet pipe in which the mixing of the turbine exhaust gases and bypass air is substantially incomplete.

By arranging that combustion of the reheat fuel takes place in partially mixed exhaust gases and bypass air, the functions of mixing, diffusing and burning are to some extent combined in the jet pipe. This can lead to a reduction in the overall length of the gas turbine engine as compared with arrangements hitherto used in which complete mixing of the turbine exhaust gases and bypass air takes place before reheat combustion. Such a reduction in length is advantageous since, as well as leading to a saving in weight, it reduces the ground clearance necessary if, for example, the engine is mounted for swivelling movement in a vertical plane.

Preferably the total exit flow cross-sectional area of no diffusing of the bypass air takes place therein.

Preferably the total exit flow cross-sectional area of the mixing means is substantially equal to the cross-sectional area of said jet pipe, at least in the region thereof occupied by the reheat combustion equipment.

The mixing means preferably comprises a plurality of angularly spaced apart chutes communicating with the bypass duct and projecting into the turbine exhaust gas stream.

The reheat combustion equipment preferably comprises first and second combustion stabilising members, with respective means for supplying fuel thereto, for burning fuel predominantly in the bypass air and the turbine exhaust gases respectively of the partially mixed gases from the mixing means.

In a preferred embodiment, the respective combustion stabilising members comprise respective members of aerodynamic section in the direction of gas flow, means being provided for supplying compressed air to each said member and discharging said compressed air outwardly from said member in the downstream portion thereof to create turbulence downstream of the member in which reheat combustion takes place. By providing combustion stabilising members of aerodynamic shape, reheat combustion equipment of relatively low drag is ensured, and as a result the losses associated with the obstruction presented in the jet pipe by the combustion stabilising members, commonly referred to as the "cold losses" are relatively reduced.

The first combustion stabilising members preferably extend substantially radially across the jet pipe and the second combustion stabilising members circumferentially in the jet pipe. Preferably, however, the first combustion stabilising members are each inclined at a small common angle to the radial direction. This allows thermally induced stresses in the combustion stabilising members to be accommodated. Said first combustion stabilising members preferably each converge in a downstream direction on the axis of the jet pipe.

If desired, it may be arranged that the respective first and second combustion stabilising members can be moved between their respective operative positions in the jet pipe and respective inoperative positions in which they are disposed substantially clear of the gaseous stream in the jet pipe.

Reheat fuel for said respective combustion stabilising members may be supplied through ducts provided internally in said respective members. Said reheat fuel may be supplied to each said first and/or second combustion stabilising member from nozzles disposed at or near the leading edge of the respective member.

The invention is particularly applicable to an engine in which the jet pipe is provided with a swivellable portion downstream of the reheat combustion equipment. With such an arrangement, the available length of jet pipe in which reheat combustion occurs, downstream of the combustion stabilising members, exceeds that normally available, and advantages of this may be taken to complete the mixing of the turbine exhaust gases and bypass air downstream of the reheat combustion equipment.

The invention will be described, merely by way of example, with reference to the accompanying drawings, in which:

FIGURE 1 illustrates diagrammatically the gas turbine bypass engine according to the present invention, part of the engine being shown cut away and in section;

FIGURE 2 is a sectional view of part of a first combustion stabilising member provided in the engine of FIGURE 1;

FIGURE 3 is a cross section on the line 3—3 of the combusion stabilising member shown in FIGURE 2;

FIGURE 4 is a cross section in a radial plane of a second combustion stabilising member provided in the engine of FIGURE 1, and FIGURE 5 is an end view of the engine taken in the direction of arrow 5 of FIGURE 1.

FIGURE 1 shows a gas turbine by-pass engine 10 comprising compressor means 11, main combustion equipment 12, turbine means 13 and a jet pipe 14. Part of the air compressed by the compressor means 11 is supplied to an annular bypass duct 15 so that it bypasses the combustion equipment 12 and turbine means 13 and is introduced into the jet pipe 14 through mixing means comprising a plurality of angularly spaced apart mixing chutes 16. In the illustrated embodiment, eight mixing chutes 16 are provided (FIGURE 5), each communicating at its upstream end with the by-pass duct 15 and projecting a substantial distance radially inwardly into a diffuser duct 17 downstream of the turbine means 13. A fixed exhaust cone 18 is mounted centrally in the diffuser duct 17 and supported therein by radial struts 19 having streamlined fairings which are secured to respective mixing chutes 16. Reheat combustion equipment, indicated generally at 20, is disposed in the jet pipe 14 downstream of the mixing chutes 16.

Downstream of the reheat combustion equipment 20 jet pipe 14 is provided with a swivellable portion comprising a first articulated section 21 which may be rotated, by means of an actuating motor indicated diagrammatically at 22, about the longitudinal axis 14' of the jet pipe 14 in bearings 23 and a second articulated section 24 which may be rotated in bearings 25 by means of a motor 26 about its longitudinal axis 24', which is inclined to the axis 14'. The upstream end of the articulated section 24 is connected to the downstream end of the articulated section 21 by means of an annular gas-tight seal 27. The axis 14' and the axis 24' of the first and second articulated sections 21, 24 respectively are inclined at equal angles to the plane of the seal 27, so that, by suitably rotating the respective articulated sections 21, 24 the direction of the axis 24', that is, the resultant direction of jet efflux from the engine 10, may be varied continuously between an undeflected position in which the axis 24' is coincident with the axis 14', and a fully deflected position, as illustrated in FIGURE 1: in the former position the engine 10 produces forward propulsive thrust for normal cruising conditions, while in the latter position the thrust is downwardly directed, as for short take-off or landing of an aircraft (not shown) in which the engine 10 is mounted.

In operation the hot gases leaving the turbine means 13 are generally travelling at high speed, for example, Mach No. 0.39, while the bypass air at the downstream end of the bypass duct 15 is travelling at a relatively slower speed, for example, Mach No. 0.22. Before reheat combustion can take place in the jet pipe 14 it is therefore necessary to slow the turbine exhaust gases down in the diffuser duct 17. The configuration of the mixing chutes 16 is accordingly designed so that diffusion of the turbine exhaust gases takes place in the diffuser duct 17 between the exit plane of the turbine means 13, indicated by broken lines at T, and the exit plane of the mixing chutes 16, indicated in broken lines at M.

The diffuser duct 17 is equivalent in effect to a frusto-conical duct the walls of which have a total inclined angle of divergence $\theta$, in a downstream direction, herein referred to as the "equivalent diffuser angle." The design of the mixing chutes 16 is so chosen that the diffusing length TM, that is the distance between the planes T and M, is as small as possible consistent with a low pressure loss in the diffuser duct 17 and stable flow conditions therein.

It is possible to design the mixing chutes 16 so that virtually no diffusion of the bypass air from the bypass duct 15 takes place, and the velocity of the bypass air passing through the chutes 16 remains substantially constant. Thus the velocity of the bypass air in the exit plane M of the mixing chutes 16 could correspond, for example, to a Mach No. of 0.207. In this case, it is necessary to diffuse the turbine exhaust gases in the diffuser duct 17 from a Mach No. of 0.39 at T to a Mach No. of 0.207 at M.

The diffusing length TM and the equivalent diffuser angle $\theta$ selected depend on the ratio between the flow cross-sectional areas of the bypass duct 15 and the turbine means 13 in the turbine exit plane T. In one example, where this ratio had a value of 1.789 the minimum pressure loss in the diffuser duct 17 would have occurred with an equivalent diffuser angle $\theta$ of 7°, while the shortest diffusing length TM for a stable diffuser would have been obtained with an equivalent diffuser angle $\theta$ of 14° and a correspondingly higher pressure loss. To strike a compromise between a short diffusing length on one hand and low pressure loss on the other, an equivalent diffuser angle $\theta$ of 10° was chosen, giving a diffusing length TM of 19.35 inches and an intermediate value for the pressure loss.

Since diffusion of the turbine exhaust gases takes place in the diffuser duct 17 upstream of the exit plane M of the mixing chutes 16, it is not necessary to provide a separate diffuser section downstream of the mixing chutes 16: consequently the total exit area of the mixing chutes 16 and diffuser duct 17 in the plane M is equal to the cross-sectional area of the jet pipe 14.

The walls of the mixing chutes 16 and the struts 19 assist in removing residual whirl in the turbine exhaust gases in the duct 17.

Partial mixing of the turbine exhaust gases and the bypass air takes place in the jet pipe 14 downstream of the mixing chutes 16. In previously proposed reheat systems for bypass gas turbine engines, reheat combustion takes place in the jet pipe 14 when substantially complete mixing of the turbine exhaust gases and bypass air has taken place, such mixing being achieved conventionally in a length of jet pipe 14 approximately equal to the diameter thereof. In the arrangement of the present invention, however, the reheat combustion equipment 20 is so disposed that reheat combustion takes place in the jet pipe 14 in a region in which the mixing of the turbine exhaust gases and bypass air is substantially incomplete. In this way, the effective length of jet pipe 14 necessary for the required degree of mixing is reduced and is equal to about half the jet pipe diameter. The completion of the mixing of turbine exhaust gases and bypass air is effected downstream of the reheat combustion equipment 20, advantage being taken of the extra length of jet pipe provided by the articulated sections 21, 24 for this purpose.

The reheat combustion equipment 20 for use with the present invention is designed so that it can effect efficient combustion of fuel in the partially mixed bypass air and exhaust gases. For this purpose the reheat combustion equipment 20 comprises first and second sets of combustion stabilising members 30, 31 for burning reheat fuel predominantly in the bypass air and the turbine exhaust gases respectively of the partially mixed gases from the mixing chutes 16.

The specific design of the combustion stabilising members 30, 31, is covered by British patent application No. 8,649/66 in the name of the National Gas Turbine Establishment and no claim is made to the design of the combustion stabilising members per se.

The first combustion stabilising members 30 extend substantially radially (FIGURE 5) from the axis 14' of the jet pipe 14 at angular positions coinciding with those of the mixing chutes 16, so that they are disposed in the path of the relatively cool, partially mixed, bypass air emerging from the chutes 16. In practice, each of the combustion stabilising members 30 is inclined at a small angle to the strictly radial direction so that strains induced therein in operation of the engine due to differential thermal expansion may be readily absorbed. The combustion stabilising members 30 converge in a downstream direction on the axis of the jet pipe 14, so that each is inclined rearwardly with respect to the axis of the jet pipe 14, as shown in FIGURES 1 and 2.

The second combustion stabilising members 31 extend circumferentially in the jet pipe 14. In the illustrated embodiment two sets of second combustion stabilising members 31 are provided at different radii in the jet pipe 14, the respective members 31 being supported by the first combustion stabilising members 30.

Three annular fuel injection manifolds 32, 33, 34 (FIGURE 2) are supported upstream of the combustion stabilising members 30, 31 by the first combustion stabilising members 30. The radially innermost and outermost manifolds 32, 34 are provided with apertures 32a, 34a respectively in their downstream facing surfaces for the injection of reheat fuel. The intermediate manifold 33 is provided with a plurality of radially extending stub pipes 35, each of which communicates with the interior of the manifold 33 and each of which is provided with a plurality of downstream facing fuel injection apertures 35a. Reheat fuel injected through the respective nozzles 46, 47 is burnt on entering this region of turbulence.

The conduit 50 is supplied with fuel from the reheat fuel control unit 40. A plurality of pairs of branch ducts 58, 60 communicate with the conduit 50 at intervals along its length. Fuel is injected from the respective ducts 58, 60 into the respective regions of turbulence downstream of the respective surfaces 56, 57 to stabilise the combustion of fuel entering said regions of turbulence from the respective nozzles 46, 47.

The construction of the second combustion stabilising members 31 (FIGURE 4) is essentially the same as that of the first combustion stabilising members 30 described above, except that the fuel supply pipe 36 and associated nozzles 46, 47 in the upstream fairing are omitted, reheat fuel being supplied to the combustion stabilising members 31 from the fuel injection apertures 32a, 34a, 35a upstream thereof (FIGURE 2). Since the construction of the second combustion stabilising members 31 corresponds in other respects to that of the first combustion stabilising members 30, corresponding reference numerals with single primes are employed to indicate parts corresponding to those of said first combustion stabilising members 30. The compressed air and fuel conduits 48', 50' are supplied with compressed air and fuel respectively from the corresponding conduits 48, 50 of the first combustion stabilising members 30, as shown diagrammatically in FIGURE 2.

Since the first combustion stabilising members 30 are disposed in a relatively cooler gas stream compared with the second combustion stabilising members 31, they may have a relatively larger thickness in a plane perpendicular to the direction of gas flow. Thus the maximum thickness of the first combustion stabilising members 30 may be, for example, 2.1 inches, while the maximum thickness of the second combustion stabilising members 31 may be 1.5 inches.

Reheat fuel is supplied to each of the manifolds 32, 33, 34 from respective pipes 36 provided internally of the first combustion stabilising members 30 (FIGURE 2) for example by branch connections as indicated in FIGURE 2 by chain-dotted lines. The pipes 36 are supplied with reheat fuel from a reheat fuel control unit indicated diagrammatically at 40 in FIGURE 1.

FIGURES 3 and 4 show the cross sections of the first and second combustion stabilising members 30, 31 respectively. Referring to FIGURE 3, the first combustion stabilising member 30 comprises a strut 41 to which hollow upstream and downstream fairings 42, 43 respectively are attached, so that the profile of the combustion stabilising member 30 in the direction of gas flow is aerodynamically "clean" or streamlined. The reheat fuel supply pipe 36 is disposed within the upstream fairing 42. In addition to the branch connections to the respective manifolds 32-34 (not shown in FIGURE 3), the pipe 36 is provided with a plurality of pairs of ducts 44, 45 spaced at intervals along the length of the pipe 36 and terminating near the leading edge of the fairing 42 in respective apertures 46, 47.

Two conduits 48, 50 extend through the strut 41, as shown in FIGURE 2. Conduit 48 is supplied with high pressure compressed air bled from a stage of the compressor means 15, through a duct 51, indicated in broken lines in FIGURE 1, which may include suitable control valving (not shown). At intervals along its length the conduit 48 is provided with pairs of branch ducts 52, 53 which supply compressed air to respective nozzles 54, 55 in the surface of the strut 41. The nozzles 54, 55 are adapted to direct respective jets of compressed air onto respective deflector surfaces 56, 57 which deflect the respective air jets outwardly from the combustion stabilising member 30, as indicated by the arrows. The deflected jets of compressed air from the respective nozzles 54, 55 create regions of turbulence on either side of the stabilising member 30 downstream of the respective surfaces 56, 57.

For minimum "cold loss" due to drag, the thickness/chord ratio of the aerodynamic sections of the combustion stabilising members 30, 31 should theoretically be 27%. In practice, however a thickness/chord ratio of 35% is selected as giving a good compromise between low "cold loss" and short overall length in the direction of gas flow.

We claim:

1. A gas turbine bypass engine comprising: compressor means, combustion equipment, turbine means, and an exhaust duct in flow series; a bypass duct arranged to receive at its upstream end a portion of the air compressed by said compressor means; mixing means in said exhaust duct by which said bypass duct communicates with said exhaust duct for causing mixing of turbine exhaust gases and bypass air downstream of said mixing means; reheat combustion equipment disposed in said exhaust duct substantially adjacent to and downstream of said mixing means; said reheat combustion equipment comprising combined combustion stabilizing means and fuel injecting means to supply fuel to the combustion stabilizing means; said combustion stabilizing means comprising first and second combustion stabilizing members of aerodynamic section in the direction of gas flow whereby reheat fuel is burnt in a region of said exhaust duct in which the mixing of turbine exhaust gases and bypass air is substantially incomplete, the bypass air being substantially undiffused in flowing through said mixing means; and means for supplying compressed air to each of said stabilizing members and discharging the compressed air outwardly from said members in the downstream portion thereof to create downstream of said members turbulence in which reheat combustion takes place.

2. An engine as claimed in claim 1 in which the aerodynamic section of the respective combustion stabilising members has a thickness to chord ratio of substantially 35%.

3. A gas turbine bypass engine comprising: compressor means, combustion equipment, turbine means, and an exhaust duct, in flow series; a bypass duct arranged to receive at its upstream end a portion of the air compressed by said compressor means; mixing means in said exhaust duct by which said bypass duct communicates with said exhaust duct for causing mixing of turbine exhaust gases and bypass air downstream of the mixing means; reheat combustion equipment disposed in said exhaust duct substantially adjacent to and downstream of said mixing means; said reheat combustion equipment comprising combined stabilizing means and fuel injecting means to supply fuel to the combustion stabilizing means; said combustion stabilizing means comprising first and second combustion stabilizing members of aerodynamic section in the direction of gas flow whereby reheat fuel is burnt in a region of said exhaust duct in which the mixing of turbine exhaust gases and bypass air is substantially incomplete, the bypass air being substantially undiffused in flowing through said mixing means, said first combustion stabilizing members extending substantially radially across said exhaust duct, and said second combustion stabilizing members extending circumferentially in said exhaust duct.

4. An engine as claimed in claim 3 in which the first combustion stabilising members are each inclined at a common small angle to the radial direction.

5. An engine as claimed in claim 3 in which the first combustion stabilising members each converge in a downstream direction on the axis of the exhaust duct.

6. A gas turbine bypass engine comprising: compressor means, combustion equipment, turbine means, and an exhaust duct in flow series; a bypass duct arranged to receive at its upstream end a portion of the air compressed by said compressor means; mixing means in said exhaust duct by which said bypass duct communicates with said exhaust duct for causing mixing of turbine exhaust gases and bypass air downstream of said mixing means; reheat combustion equipment disposed in said exhaust duct substantially adjacent to and downstream of said mixing means; said reheat combustion equipment comprising combined combustion stabilizing means and fuel injecting means to supply fuel to the combustion stabilizing means; said combustion stabilizing means comprising first and second combustion stabilizing members of aerodynamic section in the direction of gas flow whereby reheat fuel is burnt in a region of said exhaust duct in which the mixing of the turbine exhaust gases and bypass air is substantially incomplete, the bypass air being substantially undiffused in flowing through said mixing means; and ducts provided internally of said first and second stabilizing members for supplying reheat fuel to the same.

7. A gas turbine bypass engine comprising: compressor means, combustion equipment, turbine means, and an exhaust duct in flow series; a bypass duct arranged to receive at its upstream end a proportion of the air compressed by said compressor means; mixing means in said exhaust duct by which bypass duct communicates with said exhaust duct for causing mixing of turbine exhaust gases and bypass air downstream of the mixing means; reheat combustion equipment disposed in said exhaust duct substantially adjacent to and downstream of said mixing means; said reheat combustion equipment comprising combined combustion stabilizing means and fuel injecting means to supply fuel to the combustion stabilizing means; said combustion stabilizing means comprising first and second combustion stabilizing members of aerodynamic section in the direction of gas flow whereby reheat fuel is burnt in the region of said exhaust duct in which the mixing of turbine exhaust gases and bypass air is substantially incomplete, the bypass air being substantially undiffused in flowing through the mixing means; and nozzles disposed substantially at the leading edge of said combustion stabilizing members, said nozzles supplying reheat fuel to at least said first combustion stabilizing member.

References Cited
UNITED STATES PATENTS

| | | | |
|---|---|---|---|
| 2,672,727 | 3/1954 | Brown | 60—39.72 |
| 2,729,937 | 1/1956 | Hausmann | 60—39.72 |
| 2,771,743 | 11/1956 | Lovesey | 60—39.72 |
| 2,883,828 | 4/1959 | Howell | 60—261 |
| 2,978,865 | 4/1961 | Pierce | 60—261 |
| 2,993,338 | 7/1961 | Wilsted | 60—39.72 |
| 3,046,731 | 7/1962 | Cambel | 60—261 |
| 3,100,627 | 8/1963 | Wilde | 60—261 |
| 3,162,011 | 12/1964 | Mullins | 60—232 |

CARLTON R. CROYLE, Primary Examiner

DOUGLAS HART, Assistant Examiner

U.S. Cl. X.R.

60—39.72, 262